US010372259B2

(12) United States Patent
Hoch et al.

(10) Patent No.: US 10,372,259 B2
(45) Date of Patent: Aug. 6, 2019

(54) TRANSCAPACITIVE TOUCH AND FORCE SENSING IN AN INPUT DEVICE

(71) Applicant: SYNAPTICS INCORPORATED, San Jose, CA (US)

(72) Inventors: David Hoch, Los Gatos, CA (US); Adam L. Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 193 days.

(21) Appl. No.: 15/199,455

(22) Filed: Jun. 30, 2016

(65) Prior Publication Data

US 2017/0242523 A1    Aug. 24, 2017

Related U.S. Application Data (60) Provisional application No. 62/297,265, filed on Feb. 19, 2016.

(51) Int. Cl.
*G06F 3/041* (2006.01)
*G06F 3/044* (2006.01)

(52) U.S. Cl.
CPC ........... *G06F 3/0416* (2013.01); *G06F 3/044* (2013.01); *G06F 3/0412* (2013.01); *G06F 3/0414* (2013.01); *G06F 2203/04101* (2013.01); *G06F 2203/04107* (2013.01)

(58) Field of Classification Search
CPC ...... G06F 3/0416; G06F 3/0414; G06F 3/044; G06F 3/0412; G06F 2203/04101; G06F 2203/04107
See application file for complete search history.

(56) References Cited

U.S. PATENT DOCUMENTS

| | | | |
|---|---|---|---|
| 7,158,122 | B2 | 1/2007 | Roberts |
| 7,681,432 | B2 | 3/2010 | Hay et al. |
| 7,784,366 | B2 | 8/2010 | Daverman et al. |
| 8,169,332 | B2 | 5/2012 | Son |
| 8,768,560 | B2 | 7/2014 | Willis |
| 9,024,907 | B2 | 5/2015 | Bolender |
| 9,057,653 | B2 | 6/2015 | Schediwy et al. |
| 9,207,801 | B2 | 12/2015 | Schediwy et al. |
| 2002/0158637 | A1 | 10/2002 | Warmack et al. |
| 2007/0229464 | A1 | 10/2007 | Hotelling et al. |

(Continued)

*Primary Examiner* — Temesghen Ghebretinsae
*Assistant Examiner* — Yaron Cohen
(74) *Attorney, Agent, or Firm* — Paradice and Li LLP (57) ABSTRACT

An example input device for force and proximity sensing includes a plurality of touch electrodes including touch transmitter electrodes and touch receiver electrodes, and a force electrode layer including a plurality of force electrodes. The input device further includes a resilient material layer disposed between the plurality of touch electrodes and the force electrode layer. The input device further includes a processing system coupled to the plurality of touch electrodes and the plurality of force electrodes, the processing system configured to: drive the transmitter electrodes with touch transmitter signals and acquire a transcapacitive proximity measurement from the touch receiver electrodes; and drive the plurality of force electrodes with force transmitter signals and acquire a transcapacitive force measurement from either the touch transmitter electrodes or the touch receiver electrodes.

20 Claims, 6 Drawing Sheets

(56) References Cited

U.S. PATENT DOCUMENTS

| | | |
|---|---|---|
| 2007/0247443 A1 | 10/2007 | Philipp |
| 2012/0086666 A1 | 4/2012 | Badaye et al. |
| 2012/0274599 A1* | 11/2012 | Schediwy ............... G06F 3/016 345/174 |
| 2012/0319987 A1 | 12/2012 | Woo |
| 2012/0327025 A1 | 12/2012 | Huska et al. |
| 2013/0068038 A1* | 3/2013 | Bolender ................ G01L 1/142 73/862.626 |
| 2013/0073142 A1 | 3/2013 | Hergesheimer et al. |
| 2013/0106794 A1 | 5/2013 | Logan et al. |
| 2013/0328821 A1* | 12/2013 | Bulea ...................... G06F 3/044 345/174 |
| 2014/0043263 A1 | 2/2014 | Park et al. |
| 2014/0085213 A1 | 3/2014 | Huppi et al. |
| 2014/0132553 A1 | 5/2014 | Park et al. |
| 2014/0345358 A1 | 11/2014 | White et al. |
| 2014/0347314 A1 | 11/2014 | Liu et al. |
| 2015/0116608 A1 | 4/2015 | Jeong |

* cited by examiner

TRANSCAPACITIVE TOUCH AND FORCE SENSING IN AN INPUT DEVICE

CROSS-REFERENCE TO RELATED APPLICATIONS

This application claims priority to U.S. Provisional Patent Application Ser. No. 62/297,265, filed Feb. 19, 2016, which is incorporated by reference herein in its entirety.

BACKGROUND

Field of the Disclosure

Embodiments of disclosure generally relate to capacitive sensors and, more particularly, transcapacitive touch and force sensing in an input device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for transcapacitive touch and force sensing in an input device are described. In an embodiment, an input device for force and proximity sensing includes a plurality of touch electrodes comprising touch transmitter electrodes and touch receiver electrodes, and a force electrode layer comprising a plurality of force electrodes. The input device further includes a resilient material layer disposed between the plurality of touch electrodes and the force electrode layer. The input device further includes a processing system coupled to the plurality of touch electrodes and the plurality of force electrodes, the processing system configured to: drive the transmitter electrodes with touch transmitter signals and acquire a transcapacitive proximity measurement from the touch receiver electrodes; and drive the plurality of force electrodes with force transmitter signals and acquire a transcapacitive force measurement from either the touch transmitter electrodes or the touch receiver electrodes.

In another embodiment, a processing system for force and proximity sensing at an input device is disclosed. The input device includes a plurality of touch electrodes separated from a force electrode layer by a resilient material layer. The processing system includes sensor circuitry configured to be coupled to: touch transmitter electrodes and touch receiver electrodes of the plurality of touch electrodes; and a plurality of force electrodes disposed on a force electrode layer. The sensor circuitry is configured to: drive the touch transmitter electrodes with touch transmitter signals and acquire touch resulting signals from the touch receiver electrodes; and drive the plurality of force electrodes with force transmitter signals and acquire force resulting signals from either the touch transmitter electrodes or the touch receiver electrodes. The processing system includes a determination module, coupled to the sensor circuitry, configured to: determine a transcapacitive proximity measurement based on the touch resulting signals; and determine a transcapacitive force measurement from the force resulting signals.

In another embodiment, a method of force and proximity sensing at an input device is disclosed. The input device includes a plurality of touch electrodes separated from a force electrode layer by a resilient material layer. The method includes driving touch transmitter electrodes of the plurality of touch electrodes with touch transmitter signals and acquiring touch resulting signals from touch receiver electrodes of the plurality of touch electrodes. The method further includes driving a plurality of force electrodes, disposed on the force electrode layer, with force transmitter signals and acquiring force resulting signals from either the touch transmitter electrodes or the touch receiver electrodes. The method further includes determining a transcapacitive proximity measurement based on the touch resulting signals, and determining a transcapacitive force measurement from the force resulting signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Figure 1:
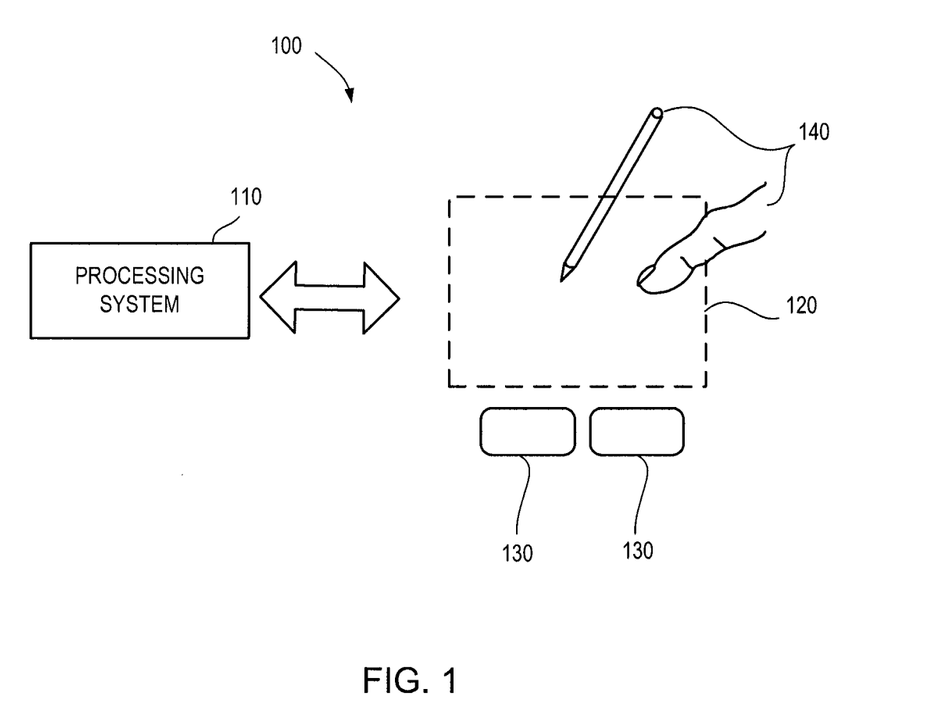
FIG. 1 is a block diagram of an exemplary input device, according to one embodiment described herein.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
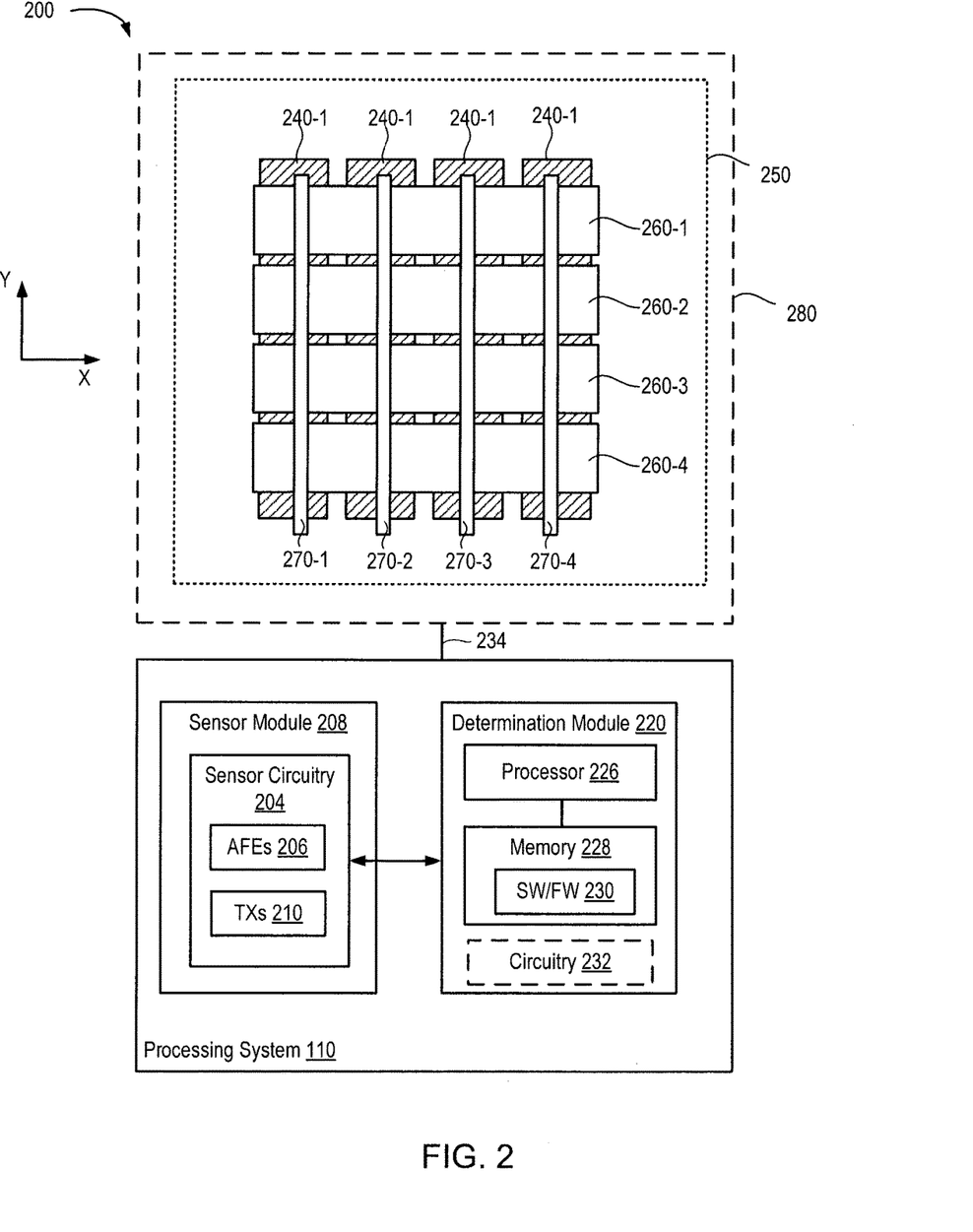
FIG. 2 is a block diagram depicting a capacitive sensing device according to some embodiments.

FIG. 2 is a block diagram depicting a capacitive sensing device 200 of the input device 100 according to some embodiments. For clarity of illustration and description, FIG. 2 shows the sensing elements of the capacitive sensing device 200 in a pattern of simple rectangles and does not show various components, such as various interconnects between the sensing elements and the processing system 110. An electrode pattern 250 comprises a first plurality of sensor electrodes 260 (260-1, 260-2, 260-3, . . . , 260-n), a second plurality of sensor electrodes 270 (270-1, 270-2, 270-3, ..., 270-*m*), and a third plurality of sensor electrodes 240 (240-1, 240-2, 240-3, ..., 240-*k*). In the example shown, n=m=k=4, but in general n, m, and k are each positive integers and not necessarily equal to each other. The electrode pattern 250 is coupled to the processing system 110 through routing traces 234. The extent of the electrode pattern 250 can be the same as, larger than, or smaller than the extent of the sensing region 120 of the input device 100 (FIG. 1).

In the example shown, each of the sensor electrodes 260 has long edge extending along the X-axis of the pattern 250. The plurality of sensor electrodes 260 is disposed along the Y-axis of the pattern 250. Each of the sensor electrodes 270 has a long edge extending along the Y-axis of the pattern 250. The plurality of sensor electrodes 270 is disposed along the X-axis of the pattern 250. Each sensor electrode 240 has a long edge extending along the Y-axis of the pattern 250. The plurality of sensor electrodes 240 is disposed along the X-axis of the pattern 250. In general, the sensor electrodes 260 cross the sensor electrodes 270. In an embodiment, the sensor electrodes 260 are orthogonal to or substantially orthogonal to the sensor electrodes 270. In general, the sensor electrodes 240 cross either or both of the sensor electrodes 260 and 270. In an embodiment, the sensor electrodes 240 are orthogonal to or substantially orthogonal to either the sensor electrodes 260 or the sensor electrodes 270. In the example shown, the sensor electrodes 240 are orthogonal to the sensor electrodes 260. Although the electrode pattern 250 is shown as square, the electrode pattern 250 can generally conform to other shapes (e.g., the electrode pattern 250 can be rectangular in a mobile device application).

While the sensor electrodes 240, 260, and 270 are shown as rectangles, it is to be understood that the sensor electrodes 240, 260, and 270 can have other shapes. In some embodiments, each sensor electrode 240, 260, and/or 270 is formed by a plurality of electrically connected sub-electrodes, where each sub-electrode has a defined shape (e.g., each sub-electrode can be a polygon). The relative sizes of sensor electrodes 240, 260, and 270 shown in FIG. 2 is exemplary. In general, any sensor electrode 240, 260, and 270 can be larger, smaller, or the same size as any other sensor electrode. Although shown as different for ease of illustration, the extent of each plurality of sensor electrodes 240, 260, and 270 in the X-Y plane of the pattern 250 can be the same or substantially the same. Also, the pitch of any plurality of sensor electrodes 240, 260, and 270 (i.e., space between electrodes) can be larger, smaller, or the same size as any other plurality of sensor electrodes.

Figure 3A:
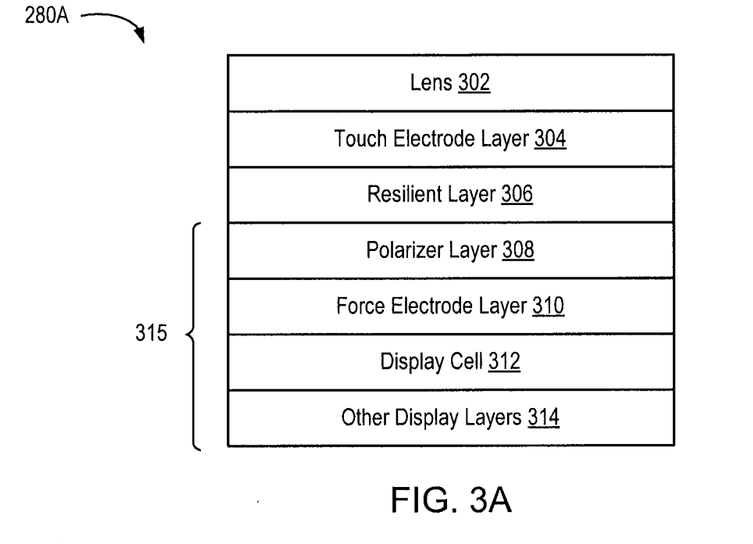
FIG. 3A is a block diagram depicting a cross-section of a display panel according to an embodiment.
Figure 3B:
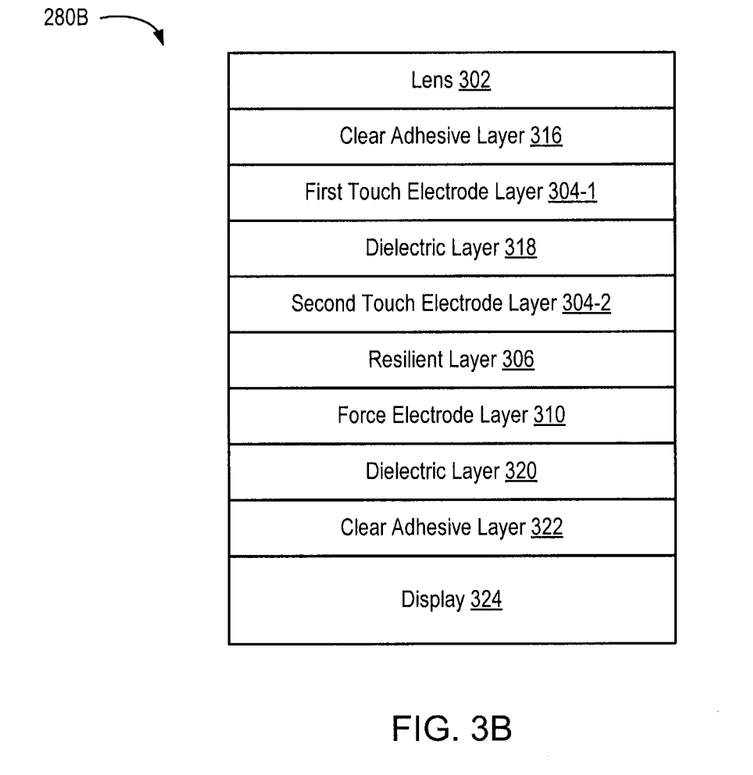
FIG. 3B is a block diagram depicting a cross-section of a display panel according to another embodiment.

The sensor electrodes 260 and the sensor electrodes 270 are typically ohmically isolated from each other. In an embodiment, one or more insulators separate the sensor electrodes 260 and the sensor electrodes 270 and prevent them from electrically shorting to each other. In some embodiments, the sensor electrodes 260 and the sensor electrodes 270 are separated by dielectric material disposed between them at cross-over areas; in such constructions, the sensor electrodes 260 and/or the sensor electrodes 270 can be formed with jumpers connecting different portions of the same electrode. Alternatively, the sensor electrodes 260 and 270 can be laid out on a layer in an arrangement where they are ohmically isolated without the use of jumpers. In some embodiments, the sensor electrodes 260 and the sensor electrodes 270 are separated by one or more layers of dielectric material. In such embodiments, the sensor electrodes 260 and the sensor electrodes 270 can be disposed on separate layers of a common substrate. In some other embodiments, the sensor electrodes 260 and the sensor electrodes 270 are separated by one or more substrates; for example, the sensor electrodes 260 and the sensor electrodes 270 can be disposed on opposite sides of the same substrate, or on different substrates that are laminated together. In some embodiments, the sensor electrodes 260 and the sensor electrodes 270 can be disposed on the same side of a single substrate. The sensor electrodes 240 are separated from the sensor electrodes 260, 270 by one or more dielectric layers, including a resilient layer. Example arrangements of sensor electrode layers are shown in FIGS. 3A and 3B, which are described below.

The sensor electrodes 260 cross the sensor electrodes 270 to form areas of localized capacitive couplings referred to as transcapacitances. The transcapacitances between sensor electrodes 260 and 270 form "capacitive pixels." During transcapacitive proximity sensing, the processing system 110 measures the capacitive pixels to generate a "capacitive image" (also referred to as a "capacitive frame") within the X-Y plane of the pattern 250. The transcapacitances between sensor electrodes of the first and second pluralities 260 and 270 change with the proximity and motion of input objects in the sensing region 120 (i.e., the capacitive pixels change from one capacitive image to the next).

Likewise, the sensor electrodes 240 cross either or both the sensor electrodes 260 or the sensor electrodes 270. During transcapacitive force sensing, the processing system 110 measures the transcapacitances between the sensor electrodes 240 and the sensor electrodes 260 or 270 to generate a "force image" (also referred to as a "force frame") within the X-Y plane of the pattern 250. The capacitive pixels formed by the third plurality of sensor electrodes 240 and the first or second pluralities of sensor electrodes 260 and 270 change with force applied to the input device 100 by input objects in the sensing region 120 (i.e., the capacitive pixels change from one force image to the next).

In an embodiment, the processing system 110 includes a sensor module 208 and a determination module 220. The sensor module 208 includes sensor circuitry 204 that operates the electrode pattern 250 to receive resulting signals from sensor electrodes using capacitive sensing signals. The determination module 220 is coupled to the sensor circuitry 204. The determination module 220 is configured to determine capacitive measurements from the resulting signals received from the sensor circuitry 204. The determination module 220 can also determine position information from the capacitive measurements. In an embodiment, the determination module 220 includes processor circuitry 226, such as a digital signal processor (DSP), microprocessor, or the like. The determination module 220 can include memory 228 configured to store software and/or firmware (SW/FW 230) configured for execution by processor circuitry 226 to implement various functions, such as filtering the resulting signals, processing the resulting signals to determine capacitive measurements, determining object position from the capacitive measurements, etc. Alternatively, some or all of the functions of the determination module 220 can be implemented entirely in hardware (e.g., using circuitry 232). The processing system 110 can include other modular configurations, and the functions performed by the sensor module 208 and the determination module 220 can, in general, be performed by one or more modules or circuits in the processing system 110.

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules, such as a display driver module.

The processing system 110 performs force sensing and/or proximity sensing (also referred to as "touch sensing"). The processing system 110 performs force sensing in force sensing periods and proximity sensing in proximity sensing periods. The force sensing periods and the proximity sensing periods can be interleaved with other periods, such as display update periods. In an embodiment, the processing system 110 performs force sensing in sequence with proximity sensing (e.g., period(s) of force sensing following period(s) of proximity sensing). In another embodiment, the processing system 110 performs force sensing concurrently with proximity sensing (e.g., the force sensing period and the proximity sensing period are a single sensing period). The processing system 110 can perform either or both of transcapacitive proximity sensing or absolute capacitive proximity sensing. In various embodiments, the processing system 110 performs transcapacitive force sensing. The term "transcapacitive sensing" as used herein encompasses both transcapacitive proximity sensing and transcapacitive force sensing.

The processing system 110 performs proximity sensing using one or more "touch electrodes" of the electrode pattern 250. The touch electrodes include the sensor electrodes 260 and the sensor electrodes 270. For transcapacitive proximity sensing, the touch electrodes include "touch transmitter electrodes" and "touch receiver electrodes." In an embodiment, the sensor electrodes 260 are touch transmitter electrodes and the sensor electrodes 270 are touch receiver electrodes. In another embodiment, the sensor electrodes 260 are touch receiver electrodes and the sensor electrodes 270 are touch transmitter electrodes.

The processing system 110 performs force sensing using one or more "force electrodes" of the electrode pattern 250. The force electrodes include the sensor electrodes 240 and either the plurality of sensor electrodes 260 or the plurality of sensor electrodes 270 depending on the arrangement of the sensor electrodes 240. In the example shown, the sensor electrodes 240 cross the sensor electrodes 260 and thus the force electrodes include the sensor electrodes 240, 260. In another embodiment, the sensor electrodes 240 cross the sensor electrodes 270 and thus the force electrodes include the sensor electrodes 240, 270. For transcapacitive force sensing, the force electrodes include force transmitter electrodes and force receiver electrodes. In an embodiment, the sensor electrodes 240 are force transmitter electrodes and the other force electrodes are force receiver electrodes. In another embodiment, the sensor electrodes 240 are force receiver electrodes and the force electrodes are force transmitter electrodes.

The sensor circuitry 204 includes analog front ends (AFEs) 206 and transmitters (TXs) 210. Each AFE 206 is configured to measure voltage, current, or charge on a sensor electrode and generate a resulting signal. Each AFE 206 can include various circuits, including any combination of an integrating amplifier or current conveyer, a sampler, a demodulator, one or more filters, an analog-to-digital converter (ADC), and the like. Each transmitter 210 is configured to drive a sensor electrode with a transmitter signal. A transmitter signal can be a time-varying signal (e.g., a sinusoidal signal, square wave signal, triangle wave signal, etc.) or a constant signal. For example, a transmitter signal can be a time-varying voltage with respect to a reference voltage (e.g., system ground) or a constant voltage with respect to the reference voltage. A time-varying transmitter signal can have fixed amplitude, frequency, and phase. Alternatively, at least one of the amplitude, frequency, and phase of a time-varying transmitter signal can be modulated. Each transmitter 210 can include a signal generator circuit configured to generate a transmitter signal having the selected characteristics.

In transcapacitive sensing, a sensor electrode that is driven with a transmitter signal is a "transmitter electrode" and a sensor electrode from which a resulting signal is received is a "receiver electrode." In an embodiment, some electrodes in the electrode pattern 250 are only capable be being receiver electrodes, while other electrodes are only capable of being transmitter electrodes. Alternatively, some electrodes in the electrode pattern 250 are capable of being receiver electrodes in one mode and transmitters electrode in another mode. The AFEs 206 are coupled to the receiver electrodes and the transmitters 210 are coupled to the transmitter electrodes. The sensor circuitry 204 can include at least one AFE 206 for each of the receiver electrodes in the electrode pattern 250. Alternatively, the sensor circuitry 204 can include less AFEs 206 than receiver electrodes and the processing system 110 can include multiplexing logic to selectively couple AFE(s) 206 to each receiver electrode during operation. Likewise, the sensor circuitry 204 can include at least one transmitter 210 for each of the transmitter electrodes in the electrode pattern 250. Alternatively, the sensor circuitry 204 can include less transmitters 210 than transmitter electrodes and the processing system 110 can include multiplexing logic to selectively couple transmitter(s) 210 to each transmitter electrode during operation. In absolute capacitive sensing, the AFEs 206 generate resulting signals using sensor electrodes of the electrode pattern 250 as there is no notion of "transmitter" or "receiver."

In absolute capacitive proximity sensing, AFEs 206 in the sensor circuitry 204 measure voltage, current, or charge on touch electrodes with respect to reference signals to generate resulting signals. Each reference signal can be time-varying or constant (e.g., a time-varying voltage signal or a constant voltage signal). For each proximity sensing period, the determination module 220 generates absolute capacitive values from the resulting signals (collectively referred to as an "absolute capacitive proximity measurement"). The determination module 220 can determine a plurality of absolute capacitance proximity measurements over a plurality of proximity sensing periods to detect input object(s) in the sensing region 120.

In transcapacitive proximity sensing, transmitters 210 in the sensor circuitry 204 drive touch transmitter electrodes with transmitter signals. AFEs 206 in the sensor circuitry 204 measure voltage, current, or charge on the touch receiver electrodes to generate the resulting signals. The resulting signals comprise the effects of the transmitter signals and input object(s) in the sensing region 120. For each proximity sensing period, the determination module 220 generates transcapacitive values from the resulting signals (collectively referred to as a "transcapacitive proximity measurement"). The determination module 220 can determine a plurality of transcapacitive proximity measurements over a plurality of proximity sensing periods to detect input object(s) in the sensing region 120.

In transcapacitive force sensing mode, transmitters 210 in the sensor circuitry 204 drive force transmitter electrodes with transmitter signals. AFEs 206 in the sensor circuitry 204 measure voltage, current, or charge on the force receiver electrodes to generate the resulting signals. The resulting signals comprise the effects of the transmitter signals and force applied by input object(s) on the input device 100. For each force sensing period, the determination module 220 generates transcapacitive values from the resulting signals (collectively referred to as a "transcapacitive force measurement"). The determination module 220 can determine a plurality of transcapacitive force measurements over a plurality of force sensing periods to detect force applied by input object(s) on the input device 100.

The processing system 110 can determine force information from one or more transcapacitive force measurements determined during force sensing. The transcapacitive force measurement can be a force image or a scalar force value, depending on the arrangement of the sensor electrodes 340. If there are a plurality of sensor electrodes 340, then the transcapacitive force measurement can be a force image that captures both a magnitude of the force and a locate of the applied force within the X-Y plane of the electrode pattern 250. If there is a single sensor electrode 304, then the transcapacitive force measurement can be a scalar force value that indicates the magnitude of the applied force or a force profile that indicates the magnitude of the applied force along a single axis of the electrode pattern 250. The force information can be combined with position information to determine both position of an input object and a force applied by the input object. In another embodiment, the magnitude of the force can be measured to determine a scalar force value. The scalar force value can be combined with position information to generate a force image or a force profile.

In some embodiments, the processing system 110 "scans" the electrode pattern 250 to determine capacitive measurements. In any transcapacitive mode, the processing system 110 drives the transmitter electrodes with transmit transmitter signals. The processing system 110 can operate the transmitter electrodes such that one transmitter electrode transmits at one time, or multiple transmitter electrodes transmit at the same time. Where multiple transmitter electrodes transmit concurrently, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals obtained from the receiver electrodes to be independently determined. The processing system 110 can operate the receiver electrodes either singly or collectively to acquire resulting signals.

In the absolute proximity sensing mode, the processing system 110 can receiving resulting signals from one touch electrode at a time, or from a plurality of touch electrodes at a time. The processing system 110 can concurrently drive all touch electrodes along one or more axes. In some examples, the processing system 110 can drive touch electrodes along one axis (e.g., the X-axis) while touch electrodes along another axis (e.g., the Y-axis) are driven with a shield signal, guard signal, or the like. In some examples, the processing system 110 drive some touch electrodes along one axis and some touch electrodes along the other axis concurrently.

The baseline capacitance of the input device 100 is a capacitive measurement with no input object in the sensing region 120. The baseline capacitance changes with the environment and operating conditions, and the processing system 110 can estimate the baseline capacitance in various ways. For example, in some embodiments, the processing system 110 takes baseline capacitive measurements (e.g., transcapacitive proximity measurement, absolute capacitive proximity measurement, transcapacitive force measurement) when no input object is present, and uses those baseline measurements as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display panel 280 used in updating a display, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-Domain Vertical Alignment (MVA)), over an emissive layer (OLED), etc. The display electrodes can also be referred to as "common electrodes," since the display electrodes perform functions of display updating and capacitive sensing. In various embodiments, each sensor electrode of the first and/or second plurality of sensor electrodes 260 and 270 comprises one or more common electrodes. In other embodiments, at least two sensor electrodes of the first plurality of sensor electrodes 260 or at least two sensor electrodes of the second plurality of sensor electrodes 270 may share at least one common electrode. Furthermore, in one embodiment, both the first plurality of sensor electrodes 260 and the second plurality electrodes 270 are disposed within a display of the display panel 280. Example display panel stacks are described below with respect to FIGS. 3A-3B. Additionally, at least one of the sensor electrodes 260, 270 in the display stack may comprise a common electrode. However, in other embodiments, only the first plurality of sensor electrodes 260 or the second plurality of sensor electrodes 270 (but not both) are disposed within the display stack, while other sensor electrodes are outside of the display (e.g., disposed on an opposite side of a color filter glass). The sensor electrodes 240 can be disposed in the display stack or outside the display stack.

FIG. 3A is a block diagram depicting a cross-section of a display panel 280A according to an embodiment. The display panel 280A is a specific implementation of the display panel 280 described above. In the embodiment, the display panel 280A includes a plurality of layers formed on a display 315, which includes a lens 302 (e.g., a glass layer or other transparent layer), a touch electrode layer 304, and a resilient layer 306. The display 315 includes a polarizer layer 308, a force electrode layer 310, a display cell 312, and other display layers 314. In general, the touch electrode layer 304 is disposed over the resilient layer 306, and the force electrode layer 310 is disposed below the resilient layer 306.

The touch electrode layer 304 includes touch transmitter electrodes and touch receiver electrodes. For example, the touch electrode layer 304 can include the sensor electrodes 260, 270 of the electrode pattern 250 described above. In the present example, the touch electrodes of the touch electrode layer 304 are deposited directly on the lens 302. The resilient layer 306 includes a resilient material having a particular modulus of resilience. The resilient layer 306 can deform temporarily in response to a force applied to the lens 302 and restore to its original shape after the force is removed from the lens 302. The force electrode layer 310 includes force electrodes. For example, the force electrode layer 310 can include the sensor electrodes 240 of the electrode pattern 250 described above. In the present example, force electrodes of the force electrode layer 310 are deposited on top of the display cell 312, such as on top of a color filter glass of the display cell 312. The display cell 312 can include various layers depending on the type of display, such as layers for an LCD display or layers for an OLED display. The other display layers 314 can include, for example, a polarizer and a backlight.

FIG. 3B is a block diagram depicting a cross-section of a display panel 280B according to an embodiment. The display panel 280B is a specific implementation of the display panel 280 described above. In the embodiment, the display panel 280B includes a plurality of layers formed on a display 324, which includes the lens 302, a clear adhesive layer 316, a first touch electrode layer 304-1, a dielectric layer 318, a second touch electrode layer 304-2, the resilient layer 306, a dielectric layer 320, and a clear adhesive layer 322. In general, the first touch electrode layer 304-1 is separated from the second touch electrode layer 304-2 by the dielectric layer 318. The first and second touch electrode layers 304-1 and 304-2 are disposed above the force electrode layer 310. The resilient layer 306 separates the second touch electrode layer 304-2 from the force electrode layer 310.

The touch electrode layer 304-1 includes touch receiver or touch transmitter electrodes. For example, the touch electrode layer 304-1 can include the sensor electrodes 260 or 270 of the electrode pattern 250 described above. In the present example, the touch electrodes of the touch electrode layer 304-1 are deposited on a top of the dielectric layer 318. The dielectric layer 318 can be a plastic layer, such as polyethylene terephthalate (PET). The dielectric layer 318 is secured to the lens 302 by the clear adhesive layer 316. The touch electrode layer 304-2 can include the other plurality of sensor electrodes 260 or 270 not part of the touch electrode layer 304-1. In the present example, the touch electrodes of the touch electrode layer 304-2 are deposited on the bottom of the dielectric layer 318. In the present example, force electrodes of the force electrode layer 310 are deposited on top of the dielectric layer 320. The dielectric layer 320 can be a plastic layer, such as PET. The dielectric layer 320 is secured to the display 324 by the clear adhesive layer 322. The display 324 can be an LCD, OLED, or the like display.

The display panel stacks shown in FIGS. 3A and 3B are just two example stacks in which the touch and force electrodes described herein can be employed. In general, the display panel 280 includes one or more touch electrode layers disposed below an input surface. The touch electrode layer(s) are separated from the force electrode layer by a resilient layer.

In an embodiment, the force electrode layer 310 includes a single force electrode, such as a single conductive plate. In an embodiment, the force electrode layer 310 comprises a conductive layer of the display, such as an anti-static layer.

Figure 4:
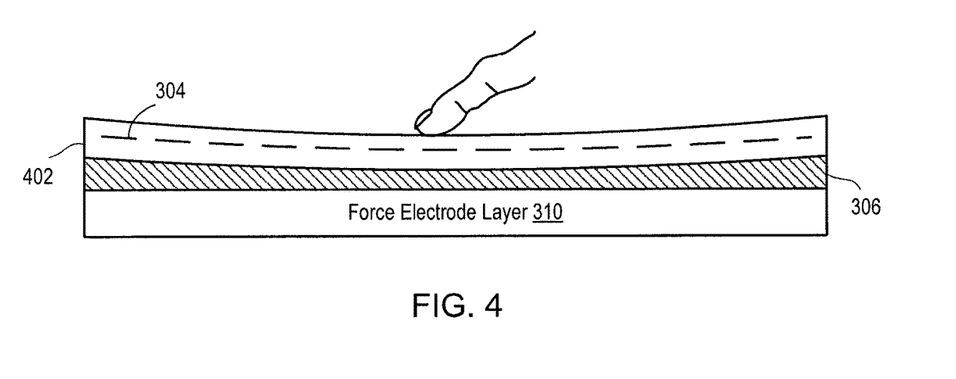
FIG. 4 is a schematic cross-section depicting a force applied to the input device by an input object according to an embodiment.

FIG. 4 is a schematic cross-section depicting a force applied to the input device 100 by an input object according to an embodiment. The input object (e.g., a finger) applies a force to the input surface (e.g., the lens 302), which in turn bends a substrate 402 having touch electrode layer(s) 304. The substrate 402 includes the layers between the lens 302 and the resilient layer 306. The bending of the substrate 402 deforms the resilient material 306 and causes at least a portion of the touch electrodes to deflect towards the force electrodes of the force electrode layer 310. As some of the touch electrodes move closer to the force electrodes, the measured capacitance changes with respect to the baseline force capacitance. When the force is removed from the input surface, the resilient layer 306 restores to its original shape and the touch electrodes return to their original position with respect to the force electrodes.

When the input object touches or is in proximity to the input surface, the touch electrodes detect the presence of the input object. That is, the input object effects the transcapacitance between the touch transmitter and touch receiver electrodes. When the input object applies force to the input surface, the force electrodes detect the applied force. That is, the force effects the transcapacitance between the force transmitter electrodes and the force receiver electrodes. The force sensing and the proximity sensing do not interact, since the force transmitter signals are designed to be orthogonal or substantially orthogonal in terms of time, frequency, and/or code, as described further below. Also, the input object is shielded from the force transmitter signal by the touch electrodes. The effectiveness of the shielding depends on the arrangement of the touch electrodes. The more of the X-Y area of the electrode pattern 250 consumed by the touch electrodes, the better the shielding. Further, the compression of the resilient layer 306 does not cause an appreciable change in the touch transcapacitance measurements. For example, the resilient layer 306 can be thinner than the pitch of the touch electrodes so that most of the electric field between the touch transmitter and receiver electrodes is formed above the input surface.

In an embodiment, if the touch electrodes are used for absolute sensing, the sensor electrodes 240 in the force electrode layer 310 can be driven with guard signals to guard the touch electrodes. In this manner, the compression of the resilient layer 306 does not affect the absolute capacitance measurements and provides a low background capacitance.

Figure 5:
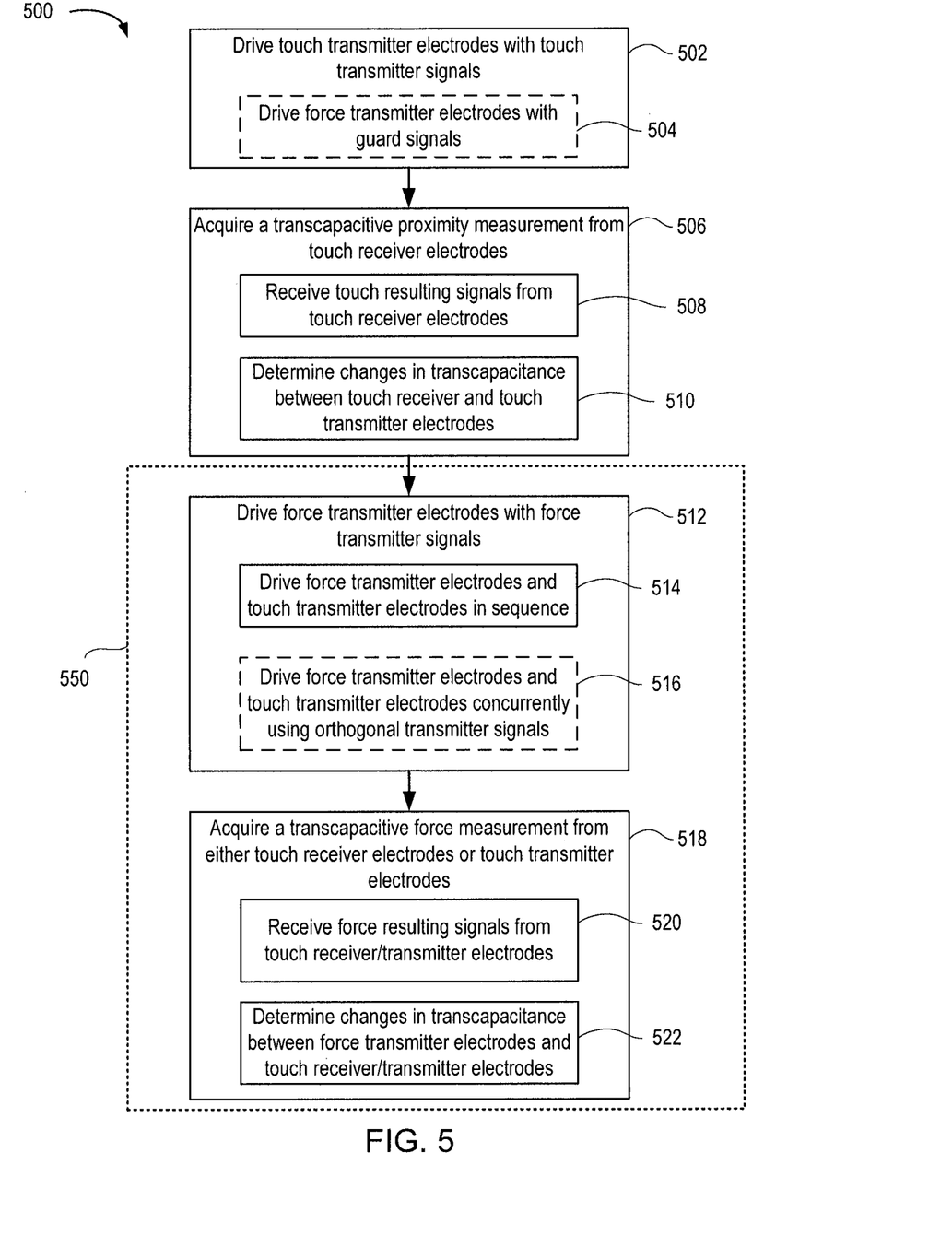
FIG. 5 is a flow diagram depicting a method of force and proximity sensing at an input device according to an embodiment.

FIG. 5 is a flow diagram depicting a method 500 of force and proximity sensing at an input device according to an embodiment. The method 500 begins at step 502, where the sensor circuitry 204 drives the touch transmitter electrodes with touch transmitter signals. In an embodiment, the force transmitter electrodes are the sensor electrodes 240 and the sensor circuitry 204 drives the sensor electrodes 240 with guard signals while driving the touch transmitter electrodes with touch transmitter signals. For example, the processing system 110 can perform the force sensing period in sequence with the proximity sensing period. In such case, during proximity sensing, the sensor electrodes 240 can be left floating or driven with a constant voltage. Alternatively, at the step 504, the sensor electrodes can 240 can be driven with guard signals that are the same or similar to the touch transmitter signals.

At step 506, the determination module 220 acquires a transcapacitive proximity measurement from the touch receiver electrodes. In an embodiment, at step 508, the sensor circuitry 204 receives touch resulting signals from the touch receiver electrodes. At step 510, the determination module 220 determines changes in transcapacitance between touch receive electrodes and touch transmitter electrodes. The processing system 110 can perform steps 502 and 506 during each proximity sensing period.

At step 512, the sensor circuitry 204 drives the force transmitter electrodes with force transmitter signals. In an embodiment, at step 514, the sensor circuitry 204 drives the force transmitter electrodes and the touch transmitter electrodes in sequence. That is, the processing system 110 performs the force sensing period in sequence with the proximity sensing period. That is, the force transmitter signals and the touch transmitter signals are orthogonal in time. In another embodiment, at step 516, the sensor circuitry 204 drives the force transmitter electrodes and the touch transmitter electrodes concurrently using orthogonal transmitter signals. That is, the processing system 110 performs the force sensing period concurrently with the proximity sensing period. In such case, the force transmitter signals can be orthogonal with the touch transmitter signals in at least one of frequency or code. That is, the force transmitter signals and the touch transmitter signals can be substantially orthogonal using, for example, orthogonal frequency division multiplexing (OFDM), code division multiplexing (CDM), or other modulation techniques that result in signals that are mathematically separable.

In an embodiment, the frequencies of the force transmitter signals and the touch transmitter signals can be mutually orthogonal or substantially orthogonal. In another embodiment, different CDM codes that modulate the transmitter signals can be used so that the transmitter signals are mutually orthogonal (e.g., the inner product between the force and transmitter signals is zero [orthogonal] or close to zero [substantially orthogonal]). The touch and force resulting signals are separated by demodulating and filtering based on orthogonal frequencies or despreading based on orthogonal CDM codes.

At step 518, the determination module 220 acquires a transcapacitive force measurement from force receiver electrodes. The force receiver electrodes can be either the touch receiver electrodes or the touch transmitter electrodes depending the arrangement of the touch electrodes with respect to the sensor electrodes 240, as discussed above. In an embodiment, at step 520, the sensor circuitry 204 receives force resulting signals from the force receiver electrodes. At step 522, the determination module 220 determines changes in transcapacitance between the force transmitter electrodes and the force receiver electrodes.

The processing system 110 can perform steps 512 and 518 during each force sensing period. As described above, the force sensing period can be in sequence with the proximity sensing period or concurrent with the proximity sensing period. Thus, the steps 512 and 518 can be performed concurrently with the steps 502 and 506. The steps 512 and 518 are part of a process 500 of force sensing, where the sensor electrodes 240 are force transmitter electrodes and one set of sensor electrodes 260, 270 are the force receiver electrodes.

Figure 6:
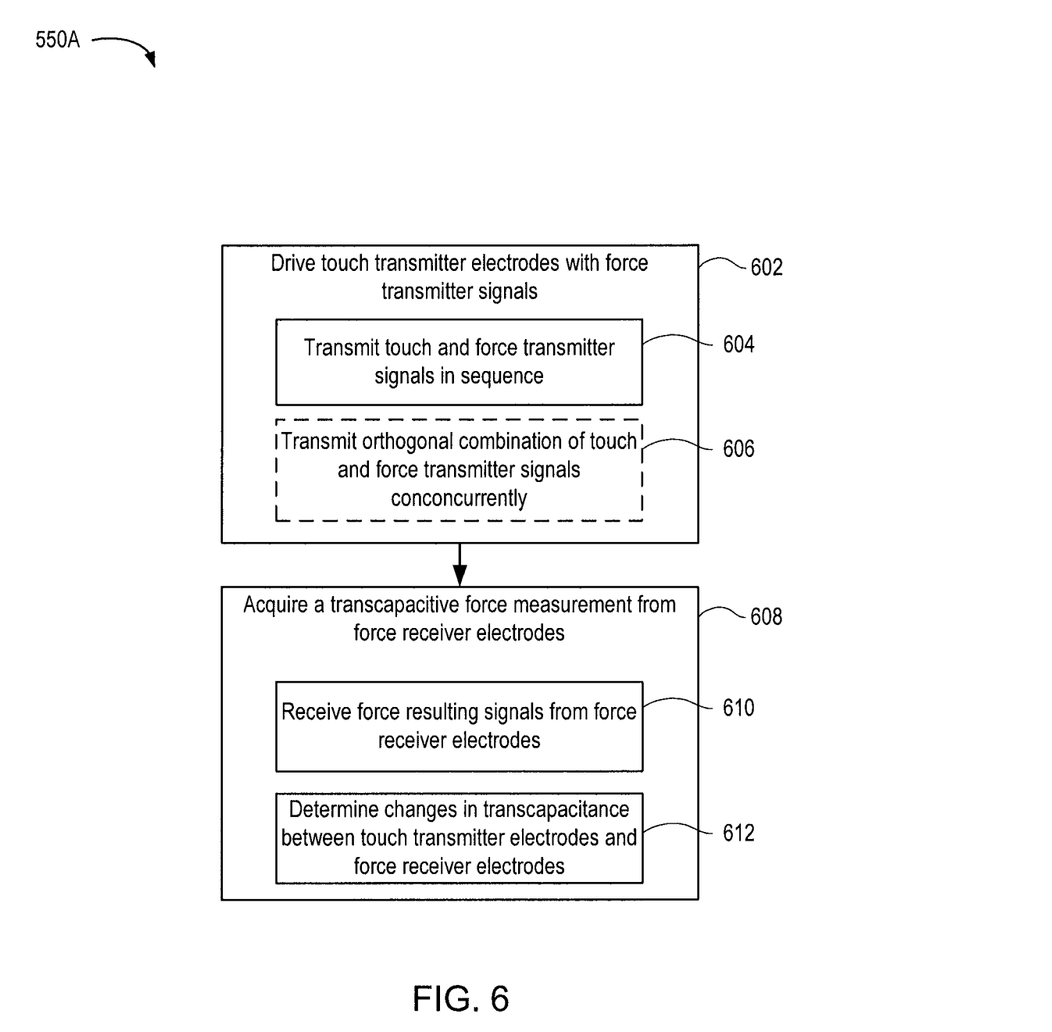
FIG. 6 is a flow diagram depicting a method of force sensing at an input device according to an embodiment.

FIG. 6 is a flow diagram depicting a method 550A for force sensing according to another embodiment. In the method 550A, the sensor electrodes 240 are force receiver electrodes and one set of the sensor electrodes 260, 270 are the force transmitter electrodes. The method 550A can be used in place of the process 550 shown in FIG. 5. The method 550A begins at step 602, where the sensor circuitry 204 drives the touch transmitter electrodes with force transmitter signals. In an embodiment, the sensor circuitry 204 transmits touch and force transmitter signals in sequence. That is, sensor circuitry 204 first drives the touch transmitter electrodes with touch transmitter signals during a proximity sensing period and then with force transmitter signals during a force sensing period. Alternatively, at step 606, the sensor circuitry 204 transmits an orthogonal combination of touch and force transmitter signals concurrently during a combined sensing period.

At step 608, the determination module 220 acquires a transcapacitive force measurement from the force receiver electrodes (e.g., the sensor electrodes 240). In an embodiment, at step 610, the sensor circuitry 204 receives force resulting signals from the force receiver electrodes. At step 612, the determination module 220 determines changes in transcapacitance between the touch transmitter electrodes and the force receiver electrodes.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. An input device for force and proximity sensing comprising:
   a plurality of touch electrodes comprising touch transmitter electrodes and touch receiver electrodes;
   a force electrode layer comprising a plurality of force electrodes;
   a resilient material layer having an original shape and being disposed between the plurality of touch electrodes and the force electrode layer, the resilient material layer configured to deform from its original shape when a force is applied to the input device to cause one or more of the plurality of touch electrodes to deflect towards the force electrode layer; and
   a processing system coupled to the plurality of touch electrodes and the plurality of force electrodes, the processing system being operable in at least a proximity sensing mode and a force sensing mode and configured to:
      when operating in the proximity sensing mode:
         drive the touch transmitter electrodes with touch transmitter signals; and
         determine a position of an input object, within a sensing region defined by the plurality of touch electrodes, based at least in part on a transcapacitive proximity measurement acquired from the touch receiver electrodes; and
      when operating in the force sensing mode:
         drive the plurality of force electrodes with force transmitter signals; and
         determine a force of the input object based at least in part on a transcapacitive force measurement acquired from at least one of the touch transmitter electrodes or the touch receiver electrodes, the transcapacitive force measurement being based on a change in capacitance between the plurality of force electrodes and the at least one of the touch transmitter electrodes or the touch receiver electrodes.

2. The input device of claim 1, wherein the touch transmitter electrodes are disposed on a layer over the resilient material layer and the touch receiver electrodes are disposed on a different layer below the resilient material layer.

3. The input device of claim 1, wherein the touch transmitter electrodes and the touch receiver electrodes are disposed on a single layer.

4. The input device of claim 1, wherein the plurality of force electrodes is disposed in a pattern oriented along a first axis.

5. The input device of claim 4, wherein the first axis along which the plurality of force electrodes is oriented is orthogonal to a second axis of either the touch transmitter electrodes or the touch receiver electrodes.

6. The input device of claim 1, wherein the force transmitter signals are orthogonal to the touch transmitter signals in at least one of time, or frequency or combination thereof, or code.

7. The input device of claim 1, wherein a thickness of the resilient material layer is less than a pitch of the plurality of touch electrodes.

8. The input device of claim 1, wherein the processing system is further configured to drive the plurality of force electrodes with guard signals while driving the touch transmitter electrodes with the touch transmitter signals.

9. The input device of claim 1, wherein the processing system is configured to acquire the transcapacitive proximity measurement from the touch receiver electrodes by receiving touch resulting signals from the touch receiver electrodes, the touch resulting signals resulting from effects of an input object in proximity to the plurality of touch electrodes.

10. The input device of claim 1, wherein the touch transmitter electrodes or the touch receiver electrodes are in proximity to an input surface of the input device to cause a change in transcapacitance between the touch transmitter electrodes and the touch receiver electrodes when an input object is in proximity to the touch transmitter electrodes or the touch receiver electrodes.

11. A processing system for force and proximity sensing at an input device, the processing system comprising:
one or more processors; and
a memory storing instructions that, when executed by the one or more processors, cause the processing system to be operable in at least a proximity sensing mode and a force sensing mode and:
when operating in the proximity sensing mode:
drive one or more touch transmitter electrodes with touch transmitter signals and determine a position of an input object within a sensing region based at least in part on touch resulting signals acquired from one or more touch receiver electrodes, wherein the sensing region is defined by the one or more touch transmitter electrodes and the one or more touch receiver electrodes;
when operating in the force sensing mode:
drive a plurality of force electrodes, disposed on a force electrode layer, with force transmitter signals, wherein the force electrode layer is separated from the touch transmitter electrodes and the touch receiver electrodes by a resilient material layer having an original shape; and
determine a force of the input object based at least in part on force resulting signals acquired from at least one of the touch transmitter electrodes or the touch receiver electrodes based at least in part on a change in capacitance between the plurality of force electrodes and the at least one of the touch transmitter electrodes or the touch receiver electrodes wherein the resilient material layer is configured to deform from its original shape when a force is applied to the input device to cause the one or more of the touch transmitter electrodes or the touch receiver electrodes to deflect towards the force layer;
determine a transcapacitive proximity measurement based on the touch resulting signals; and
determine a transcapacitive force measurement from the force resulting signals.

12. The processing system of claim 11, wherein the force transmitter signals are orthogonal to the touch transmitter signals in at least one of time, frequency, or code.

13. The processing system of claim 11, wherein the processing system is further configured to drive the plurality of force electrodes with guard signals while driving the touch transmitter electrodes with the touch transmitter signals.

14. The processing system of claim 11, wherein the touch resulting signals result from effects of an input object in proximity to the one or more touch electrodes.

15. The processing system of claim 11, wherein the force resulting signals result from effects of displacement of at least one of the one or more touch electrodes with respect to the force electrode layer in response to compression of the resilient material layer.

16. A method of force and proximity sensing at an input device operable in at least a proximity sensing mode and a force sensing mode, the method comprising:
when operating in the proximity sensing mode:
driving one or more touch transmitter electrodes with touch transmitter signals and determining a position of an input object within a sensing region based at least in part on touch resulting signals acquired from one or more touch receiver electrodes, wherein the sensing region is defined by the one or more touch transmitter electrodes and the one or more touch receiver electrodes;
when operating in the force sensing mode:
driving a plurality of force electrodes, disposed on a force electrode layer, with force transmitter signals, wherein the force electrode layer is separated from the touch transmitter electrodes and the touch receiver electrodes by a resilient material layer having an original shape; and
determining a force of the input object based at least in part on force resulting signals acquired from at least one of the touch transmitter electrodes or the touch receiver electrodes based at least in part on a change in capacitance between the plurality of force electrodes and the at least one of the touch transmitter electrodes or the touch receiver electrodes wherein the resilient material layer is configured to deform from its original shape when a force is applied to the input device to cause the one or more of the touch transmitter electrodes or the touch receiver electrodes to deflect towards the force layer;
determining a transcapacitive proximity measurement based on the touch resulting signals; and
determining a transcapacitive force measurement from the force resulting signals.

17. The method of claim 16, further comprising driving the plurality of force electrodes with guard signals while driving the touch transmitter electrodes with the touch transmitter signals.

18. The method of claim 16, wherein the force transmitter signals are orthogonal to the touch transmitter signals in at least one of time, frequency, or code.

19. The method of claim 16, wherein the touch resulting signals result from effects of an input object in proximity to the one or more touch transmitter electrodes.

20. The method of claim 16, wherein the force resulting signals result from effects of displacement of at least one of the one or more touch transmitter electrodes with respect to the force electrode layer in response to a deformation of the resilient material layer.

\* \* \* \* \*